June 23, 1931.  R. M. WILLIS ET AL  1,811,739
ATTACHMENT FOR TRUCKS
Filed June 25, 1928   2 Sheets-Sheet 2
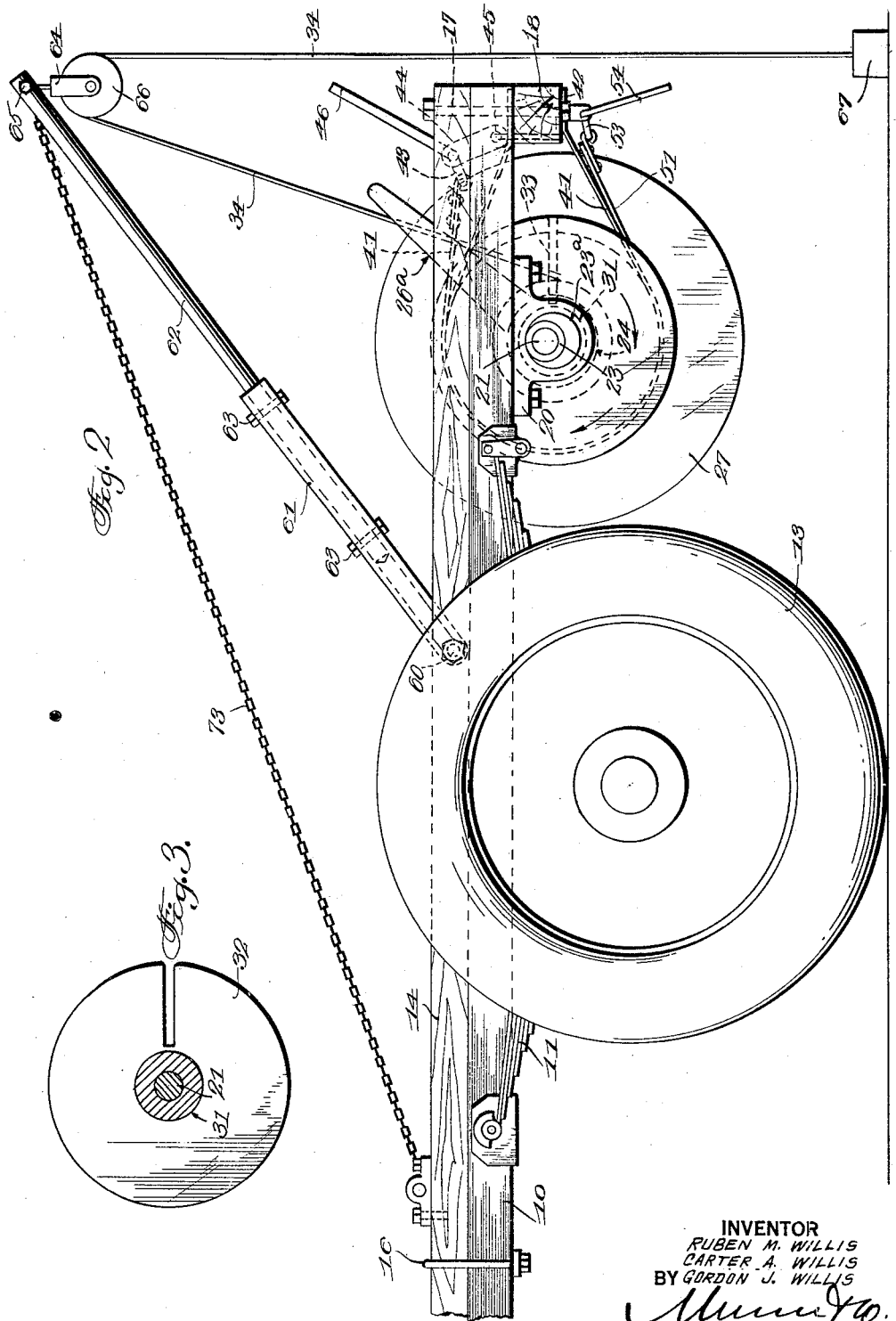
INVENTOR
RUBEN M. WILLIS
CARTER A. WILLIS
BY GORDON J. WILLIS
ATTORNEY Patented June 23, 1931

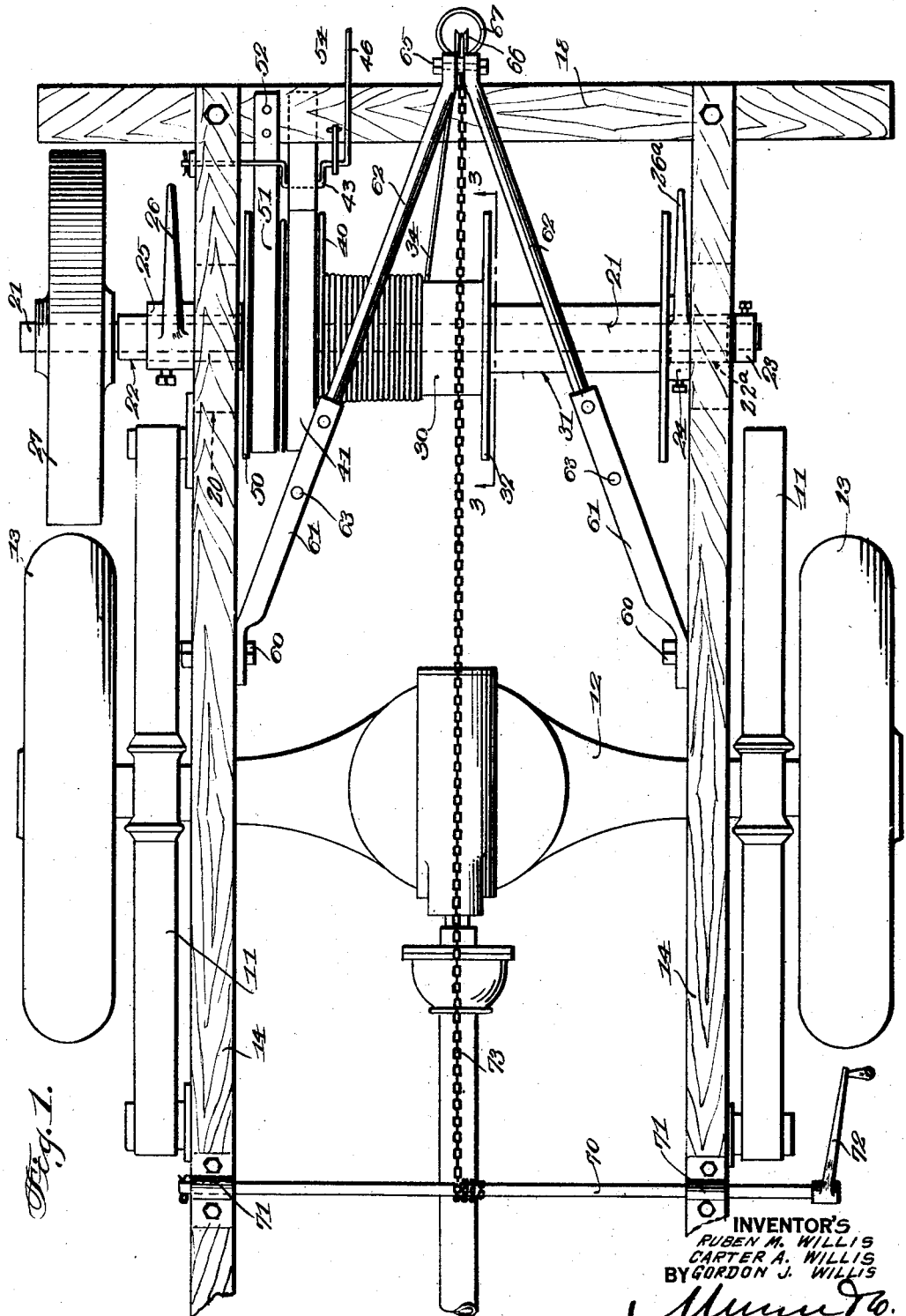

1,811,739

UNITED STATES PATENT OFFICE

REUBEN M. WILLIS, CARTER A. WILLIS, AND GORDON J. WILLIS, OF CHANUTE, KANSAS, ASSIGNORS TO THE WILLIS DRILLING MACHINE AND MANUFACTURING COMPANY, OF CHANUTE, KANSAS, A CORPORATION OF KANSAS

ATTACHMENT FOR TRUCKS

Application filed June 25, 1928. Serial No. 288,169.

This invention relates to an attachment for trucks for use in gas wells.

An object of the invention is the provision of a device adapted to be attached to a truck as a unit for lowering a swabbing device into a gas well or for removing the same, said unit containing means adapted to be operatively connected with the power plant of the truck.

A further object of the invention is the provision of an attachment for a truck forming a removable unit and provided with mechanism adapted to be operated by the power plant of the truck for removing a swabbing device from a gas well, or for lowering the same into the well, braking means being employed for controlling the raising or lowering at will, the braking device controlling a plurality of drums of different diameters on a single shaft, with the common flange between the drums being provided with a slot through which the actuating cable may be passed for winding a cable on the different drums.

This invention will be best understood from a consideration of the following detailed description, in connection with the accompanying drawings; nevertheless, it is to be understood that the invention is not confined to the disclosure being susceptible of such changes and modifications as shall define no material departure from the salient features of the invention as expressed in the appended claims.

In the drawings:—

Figure 1 is a plan view of the attachment shown applied to the rear end of a truck, Figure 2 is a side view in elevation of the attachment, Figure 3 is a transverse vertical section taken along the line 3—3 of Fig. 1.

Referring more particularly to the drawings 10 designates a pair of channel beams extending longitudinally of the truck and forming part of the frame and chassis. Springs 11 are employed for connecting the rear axle housing 12 to the chassis frame. Wheels 13 are mounted on the axle housing and driven by the axle (not shown). Wooden beams 14 are secured respectively to the upper faces of the channel beams 10 by means of bolts 16 and 17. A transverse beam 18 is secured by means of the bolt 17 to the outer ends of the beams 14 and also to the channel beams 10. Wooden beams 14 and 18 constitute a frame which is removably connected to the frame of the chassis.

A pair of bearings 20 are secured to the channel beams 10 and depend from the under face thereof. A shaft 21 is mounted in eccentric sleeves 22 and 22$^a$ which in turn are mounted in the bearings 20. A pair of collars 23 and 24 are located upon opposite sides of a beam 14 and maintain the shaft and sleeve 22$^a$ in position. Collar 23 is secured to shaft 21 while collar 24 is secured to sleeve 22$^a$. A collar 25 is secured to the eccentric sleeve 22 and is provided with a lever 26 for rotating said sleeve, for a purpose which will be presently explained. Collar 24 also has a lever 26$^a$ for rotating the sleeve 22$^a$. A pulley 27 is secured to the outer end of the shaft 21 and is adapted to engage a wheel 13 so that when the rear end of the truck is jacked up the wheels 13 will be revolved by the power plant and pulley 27 will likewise be revolved.

A spool 30 is secured to the shaft 21 and a spool 31 of a smaller diameter than the spool 30 is formed integrally with the first mentioned spool and thereby revolved by the shaft 21. A common flange 32 separates the two spools and is provided with a slot 33 through which the cable 34 is adapted to be passed when it is desired to wind the cable on the spool 31 instead of being wound on spool 30.

A brake drum 40 is connected with the spool 30 at one end upon which is trained a brake band 41 having one end secured, as shown at 42, to the under face of the beam 18. The upper end is connected to a link 44 pivoted at 45 on the upper face of the beam 18. A handle 46 is adapted to actuate the links 43 and 44 and draws up the brake band 41 tight upon the brake drum 40.

A second brake drum 50 likewise forms an integral part of the spool 30 and has a brake band 51 trained around the same and having one edge 52 secured to the upper face of the beam 18. The other end is connected to a toggle lever 53 which is operated by a handle 54 for drawing the brake band 51 up taut on the brake drum 50.

An adjustable derrick is pivotally connected to the beams 14 at 60, the pivotal connection being in the form of bolts passing through the beams 14. The derrick consists of a pair of sleeves 61 to receive rods 62 which are telescoped within the sleeves 61. The rods and sleeves are perforated to receive pins or bolts 63 to permit adjustment of the rods 62 within the sleeves 61. A U-shaped hanger 64 is suspended from a bolt 65 carried by the outer free ends of the rods 62. A pulley 66 is carried by the hanger 64 and is adapted to receive the cable 34. The lower end of the cable extends downwardly into a pipe 67 forming the head of the gas well.

A crank shaft 70 is pivotally mounted in bearings 71 connected to the upper faces of the beams 14. The crank 72 is connected to the outer free end of the shaft 70 and is provided for the purpose of rotating said shaft. A chain 73 is secured at one end to the shaft 70 and the other end of said chain is connected to the outer free ends of the rods 62. The operation of my device is as follows:

The truck is moved to a point of vantage after the unit has been applied to the frame of the chassis and the shaft 70 is revolved causing the chain 73 to elevate the arms of the derrick to their proper height so that the cable 34 will be located in spaced relation. The rear end of the truck is then jacked up and the power plant is operatively connected through the usual transmission, with the rear wheels 13 by which said wheels are revolved in the proper direction. The levers 26 and 26ª are then actuated whereby the eccentrics will cause the wheel 27 to be moved into contacting relation with the adjacent rear wheel 13 and cause rotation of the wheel 27. It will be appreciated that the direction of rotation of the drums 30 and 31 will depend upon the direction of rotation of the wheels 13. The direction of rotation of the last mentioned wheels, of course, depends upon the proper position of the usual transmission of the truck.

When the spools or drums 30 and 31 are revolved in the direction indicated by the arrow in Fig. 2, the cable is wound on a spool, thereby pulling the swabbing or pipe which is attached to the end of the cable 34 from the well 67. The reverse rotation of the spools will permit lowering of the swab or pipe into the well. When the toggle lever 54 is operated and the spools are being revolved in the direction indicated by the arrow in Fig. 2, the spools will be held against rotation so that the cable 34 will be maintained stationary. When the spools are revolved in the opposite direction, the lever 46 is actuated for applying the brake band 41 to the brake drum 40.

If the cable is being wound on the spool 30, and it is desired to decrease the speed of the winding operation, the cable is inserted through the slot 33 of the flange 32 whereby the cable will be wound upon the spool 31.

In order to operate the hoist efficiently the wheel 27 must be disengaged from the wheel 13 before the brakes are applied.

We claim:—

1. An attachment for a truck provided with traction wheels, comprising a frame, a cable, a derrick mounted on the frame for supporting the cable, a shaft mounted on the frame, a pulley on the shaft, eccentrics receiving the shaft and adapted when actuated for laterally displacing the shaft and pulley for causing the pulley to frictionally engage a traction wheel, and spools driven by the shaft and connected with the cable for winding up the cable.

2. An attachment for a truck provided with traction wheels, comprising a frame, a cable, a derrick mounted on the frame for supporting the cable, a shaft mounted on the frame, a pulley on the shaft, eccentrics receiving the shaft and adapted when actuated for laterally displacing the shaft and pulley for causing the pulley to frictionally engage a traction wheel, spools driven by the shaft and connected with the cable for winding up the cable, said spools being of different diameters, and an annular flange separating the spools.

3. An attachment for a truck provided with traction wheels, comprising a frame, a cable, a derrick mounted on the frame for supporting the cable, a shaft mounted on the frame, a pulley on the shaft, eccentrics receiving the shaft and adapted when actuated for laterally displacing the shaft and pulley for causing the pulley to frictionally engage a traction wheel, spools driven by the shaft and connected with the cable for winding up the cable, a pair of brake drums secured to the shaft, a brake strap trained around each brake drum and having one end secured to the frame, and means for actuating each strap, one brake strap having the free end above the shaft, the free end of the other strap being located below the shaft.

4. An attachment for a truck provided with traction wheels, comprising a frame, a cable, a derrick mounted on the frame for supporting the cable, a shaft mounted on the frame, a pulley on the shaft, eccentrics receiving the shaft and adapted when actuated for laterally displacing the shaft and pulley for causing the pulley to frictionally engage a traction wheel, spools driven by the shaft and connected with the cable for winding up the cable, and a plurality of means for braking the shaft, one of the braking means acting to restrain rotation of the shaft in one direction, the other braking means restraining rotation of the shaft in the other direction.

REUBEN M. WILLIS.
GORDON J. WILLIS.
CARTER A. WILLIS.